United States Patent [19]

Morris et al.

[11] Patent Number: 4,459,442
[45] Date of Patent: Jul. 10, 1984

[54] GAS FLOW DETECTORS

[75] Inventors: Stephen J. Morris, Halesowen; Stephen D. Cooper, Quinton, both of England

[73] Assignee: Plant Energy Systems Limited, Warley, England

[21] Appl. No.: 335,446

[22] Filed: Dec. 29, 1981

[30] Foreign Application Priority Data

Jan. 9, 1981 [GB] United Kingdom ............ 8100597
Aug. 17, 1981 [GB] United Kingdom ............ 8125066

[51] Int. Cl.³ ................. H01H 29/00; H01H 35/00
[52] U.S. Cl. ......................... 200/61.05; 200/81.9 R
[58] Field of Search ............ 200/61.04, 61.05, 81.9 R

[56] References Cited

U.S. PATENT DOCUMENTS

| 2,403,938 | 7/1946 | Macan | 200/81.9 R X |
| 2,839,742 | 6/1958 | Sumner | 200/61.05 X |
| 2,841,667 | 7/1958 | Stowe | 200/81.9 R |
| 4,296,310 | 10/1981 | Luebke et al. | 200/61.05 X |

FOREIGN PATENT DOCUMENTS 2022846 12/1979 United Kingdom.

Primary Examiner—J. R. Scott
Attorney, Agent, or Firm—Scrivener, Clarke, Scrivener and Johnson

[57] ABSTRACT

A flow detector, for use adjacent a steam trap to detect an unacceptable level of leakage of steam through the trap, comprises a tubular housing substitutable for a standard pipe nipple. The housing comprises a boss which provides a condensate collecting well in which an electrode is exposed. Immediately opposite the well, on the opposite side of a flow passage provided by the housing, is a baffle in the form of a ramp arranged to divert steam towards the well. In normal conditions of use, the presence of condensate in the well is signalled by an electric current passing between the electrode and the housing. Should an excessive steam flow occur in the passage, steam diverted by the ramp displaces the condensate from the well around the electrode and stops the flow of current. A similar detector could be of use in a compressed air line.

6 Claims, 4 Drawing Figures

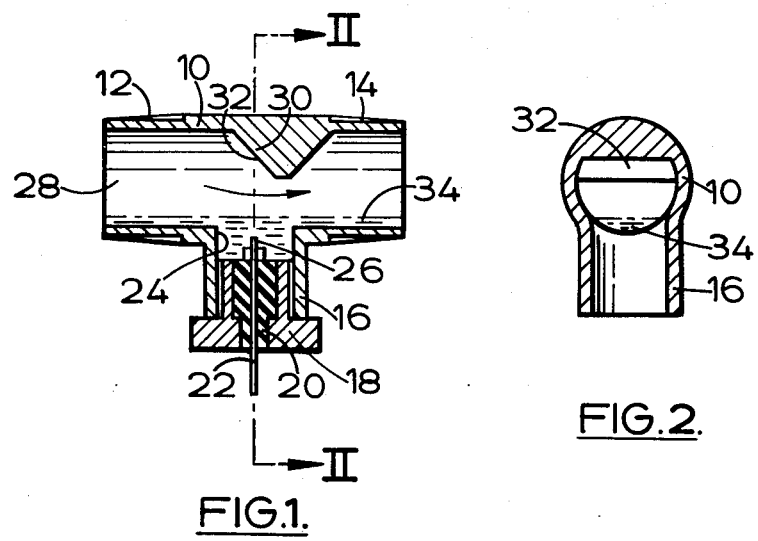
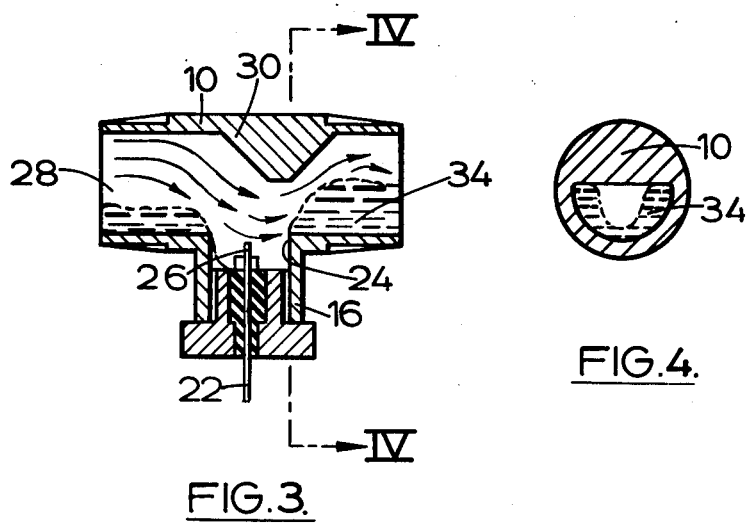

GAS FLOW DETECTORS

BACKGROUND OF THE INVENTION

This invention is concerned with improvements in or relating to gas flow detectors adapted to detect an excessive flow of gas. The invention may particularly find application in steam flow detectors for use in steam flow lines adjacent steam traps, to detect an unacceptable level of leakage of steam through the traps. However, similar flow detectors might find application in, for example, compressed air lines where similar problems can arise. By the term "gas" where used herein is merely meant a fluid in a gaseous state, and the term is to be understood specifically to include both steam and air.

To avoid wastage of steam, it is desirable to check steam traps at intervals for leaks. Efficient operation of a steam trap can be checked, without disassembling the trap, by various methods (for example, ultrasonic methods) but these require special equipment and a skilled operator.

For detecting steam trap leakage, detectors are available which can be permanently installed adjacent a trap in a steam flow line. However, with known detectors problems can arise from the fact that where the detector is to be added to an existing flow line, there is frequently found to be only a very short length of horizontal pipe available for removal and replacement by a detector. Sometimes installation is further complicated by another piece of equipment, for example a filter, close to the steam trap in the flow line. Accordingly it is very desirable that a detector be of short length, so that usually it can be readily inserted without substantial modification of the existing arrangement of pipework and equipment.

Available detectors tend to be of such length that one is commonly unable to insert them into an existing flow line without substantially modifying the existing arrangement of pipework and equipment. Such modification work necessarily increases the difficulty of installing the detector, and puts up the cost of the installation operation. Furthermore, available detectors tend to be of a relatively expensive construction.

For example, one known kind of detector for use in association with a steam trap is described in British patent application No. 2 022 846. That detector is arranged to operate on a U-tube principle. Any steam passing through the detector in normal use passes through an aperture in a baffle which extends into a well containing condensate. An electrode is positioned within the well on the inlet side of the baffle to signal, in normal use of the detector with little or no steam passing through, that it is covered by condensate. Should the steam flow through an associated trap become excessive, the pressure drop at the outlet of the detector will cause the condensate level on the outlet side of the baffle to rise, and the level on the inlet side of the baffle to fall correspondingly. The fall in level on the inlet side causes the electrode to become uncovered and a signal is given.

SUMMARY OF THE INVENTION

It is an object of the present invention to provide an improved gas flow detector, which can be of a simple construction and short length to fit readily into an existing flow line.

The invention provides in one of its aspects a gas flow detector comprising means providing a gas flow passage, detecting means arranged to indicate in normal use of the detector that there is liquid at a liquid collecting zone of the passage, and deflecting means arranged at a position across the passage from the collecting zone to tend to cause a flow of gas passing between the deflecting means and the collecting zone to be deflected towards said zone, the arrangement being such that an excessive flow of gas along the passage will be indicated by an absence of liquid at the collecting zone owing to displacement of the liquid from the zone by the deflected gas flow.

The detector preferably comprises a body of a similar form to a standard pipe nipple, for example meeting one of British Standards Nos. 1387 and 3799, so that the detector can be substituted for such a nipple in existing pipework.

The detecting means can take any suitable form but is preferably of an electrical kind comprising an electrode which is arranged at the collecting zone to form part of an electrical circuit completed by liquid at the zone. The detecting means may comprise a second electrode for electric current to pass between the electrodes, but where a housing of the detector is itself electrically conductive, for example being of metal, the current can pass between the electrode and the housing.

In a preferred form, the detector comprises a liquid collector in the form of a well, the collecting zone being within the well.

The deflecting means may conveniently comprise a baffle in the form of a ramp, and the ramp may comprise a deflecting face inclined at an angle of 45° to the direction of the passage. The baffle may most advantageously be positioned immediately opposite the collecting zone on the other side of the passage.

There now follows a detailed description, to be read with reference to the accompanying drawings, of a steam flow detector which illustrates the invention by way of example.

BRIEF DESCRIPTION OF THE DRAWING

In the accompanying drawings:

FIG. 1 is an axial section through the detector, with steam and condensate illustrated in a first condition in use of the detector;

FIG. 2 shows a section through the detector on the line II—II of FIG. 1;

FIG. 3 is a view similar to FIG. 1 but illustrating steam and condensate in a second condition; and FIG. 4 shows a section through the detector on the line IV—IV of FIG. 3.

DESCRIPTION OF THE PREFERRED EMBODIMENT

The detector comprises a generally tubular metal housing 10 comprising externally screw-threaded end portions 12 and 14. The length of the housing 10, and the diameter and form of the screw threads, are such that the detector is directly substitutable for a barrel nipple meeting one of British Standards Nos. 1387 and 3799.

The housing 10 comprises a tubular boss 16 midway along its length, an outer portion of the boss being internally screw-threaded. An externally screw-threaded plug 18 is mounted in the boss and carries an electrically insulating mounting 20 holding an electrode 22 of detecting means of the detector. The boss 16 provides a condensate collector 24 in the form of a well, and an exposed head portion 26 of the electrode, projecting from the mounting 20, is positioned within the well 24.

The tubular housing 10 provides a steam flow passage 28 comprising a condensate collecting zone within the well 24 and surrounding the exposed head portion 26 of the electrode.

The detector comprises also deflecting means comprising a baffle arranged as a ramp 30. The ramp is an integral part of the housing 10 and projects into the flow passage 28 on the opposite side of the passage from the well 24. The baffle is positioned immediately opposite the well 24, and has a plain deflecting face 32 inclined at an angle of 45° to the direction of the passage, though we have found that the angle need not be critical.

In use of the detector it is installed in a generally horizontally extending steam flow line immediately adjacent a steam trap. Condensate 34 will in normal use of the detector collect in the bottom of the flow passage 28, and in particular will collect in the collecting well 24 to a depth sufficient to cover the head portion 26 of the electrode 22. The electrode 22 and the housing 10 are connected together in an electrical circuit with a potential difference across them. The condensate collected in the well 24 conducts electricity between the electrode and the housing, so that a current flows in the circuit and is signalled by suitable indicating means (not shown) to indicate that there is condensate at the collecting zone. Uncondensed steam occupies the passage 28 above the condensate 34, and will flow along the passage between the ramp 30 and the well 24 (from left to right as illustrated in the drawings) to the steam trap with any leakage of steam from the steam trap.

If a flow of steam along the passage 28 is small the condensate in the collecting well 24 will remain substantially undisturbed by the steam flow and the head portion 26 of the electrode will remain covered (as illustrated by FIG. 1). However, as the steam flow increases, so the tendency increases for the steam to be deflected, across the passage 28 towards the collecting well, owing to the presence of the ramp 30. The arrangement is such that in the event that there is an excessive flow of steam along the passage 12, indicating a serious and unacceptable rate of leakage of steam from the steam trap, steam will be deflected into the collecting well and displace the condensate from the collecting zone (as shown in FIGS. 3 and 4); the removal of the condensate will mean that a current can no longer pass between the electrode 22 and the housing 10, and the absence of condensate at the collecting zone will be signalled by the indicating means.

The mounting arrangement for the electrode 22 can be such as to allow variation of the depth at which its head portion 26 is positioned in the well 24, to vary the sensitivity of the detector.

We claim:

1. A gas flow detector comprising means providing a gas flow passage, detecting means arranged to indicate in normal use of the detector that there is liquid at a liquid collecting zone of the passage, and deflecting means arranged at a position across the passage from the collecting zone to cause gas flowing in said passage to pass at all times between the deflecting means and the collecting zone and be deflected towards said zone, said deflecting means being positioned and dimensioned with respect to said zone that when there is an excessive flow of gas along said passage gas flow is deflected into said zone to displace liquid therefrom and thereby indicate excessive gas flow.

2. A detector according to claim 1 in which the detecting means comprises an electrode arranged at the collecting zone and spaced from a second electrically conductive element whereby a conductive path between the elements can be completed by electrically conductive liquid at the zone.

3. A detector according to either claim 1 or claim 2 comprising a liquid collecting trap in the form of a well, said collecting zone being within the well.

4. A detector according to either claim 1 or claim 2 in which said deflecting means comprises a baffle arranged as a ramp.

5. A detector according to claim 4 in which the baffle comprises a deflecting face inclined at an angle of 45° to the direction of the passage.

6. A detector according to either of claims 4 and 5 in which the baffle is positioned immediately opposite the collecting zone on the other side of the passage.

* * * * *